United States Patent [19]

Kubierschky et al.

[11] Patent Number: 4,893,015

[45] Date of Patent: Jan. 9, 1990

[54] DUAL MODE RADIOGRAPHIC MEASUREMENT METHOD AND DEVICE

[75] Inventors: Klaus Kubierschky, North Reading; Herbert L. Aronson, Newton, both of Mass.

[73] Assignee: American Science and Engineering, Inc., Cambridge, Mass.

[21] Appl. No.: 32,692

[22] Filed: Apr. 1, 1987

[51] Int. Cl.⁴ ............................................. G01T 1/208
[52] U.S. Cl. ..................................... 250/369; 250/362
[58] Field of Search ................... 250/369, 207, 370.07, 250/374, 388, 362

[56] References Cited

U.S. PATENT DOCUMENTS

| | | | |
|---|---|---|---|
| 2,750,513 | 6/1956 | Robinson et al. | 250/71 |
| 2,821,633 | 1/1958 | Friedman | 250/71 |
| 3,012,140 | 12/1961 | Pellissier et al. | 250/51.5 |
| 3,082,323 | 3/1963 | Chope et al. | 250/83.3 |
| 3,088,030 | 4/1963 | Rickard | 250/71.5 |
| 3,114,832 | 12/1963 | Alvarez | 250/51.5 |
| 3,180,985 | 4/1965 | Leighton | 250/43.5 |
| 3,193,680 | 7/1965 | Anderson | 250/83.3 |
| 3,210,545 | 10/1965 | Barnett | 250/83.3 |
| 3,379,881 | 4/1968 | Leroy | 250/71.5 |
| 3,452,197 | 6/1969 | Saylor, Jr. et al. | 250/71.5 |
| 3,569,708 | 3/1971 | Weinbaum | 250/83.3 |
| 3,733,491 | 5/1973 | Holland, Jr. | 250/207 |
| 3,866,047 | 2/1975 | Hounsfield | 250/360 |
| 3,881,110 | 4/1975 | Hounsfield et al. | 250/360 |
| 3,922,541 | 11/1975 | Seeman | 250/256 |
| 3,943,458 | 3/1976 | Cohn | 250/207 |
| 3,946,234 | 3/1976 | Hounsfield | 250/363 S |
| 3,956,633 | 5/1976 | Hounsfield | 250/362 |
| 3,996,467 | 12/1976 | Froggatt et al. | 250/366 |
| 4,092,539 | 5/1978 | Pao et al. | 250/369 |
| 4,138,640 | 2/1979 | Cousins | 324/76 A |
| 4,413,183 | 11/1983 | Metal et al. | 250/363 S |
| 4,423,329 | 12/1983 | De Burgos Garcia et al. | 250/388 |
| 4,486,663 | 12/1984 | Arseneau | 250/363 S |
| 4,588,892 | 5/1986 | Kopp | 250/388 |
| 4,599,690 | 7/1986 | Stoub | 364/414 |
| 4,603,256 | 7/1986 | Lelong | 250/361 R |
| 4,612,443 | 9/1986 | Alcidi | 250/362 |
| 4,767,929 | 8/1988 | Valentine | 250/388 |
| 4,825,077 | 4/1989 | Tawil et al. | 250/369 |

FOREIGN PATENT DOCUMENTS 58-35481  3/1983  Japan ................................... 250/369

Primary Examiner—Carolyn E. Fields
Assistant Examiner—John A. Miller
Attorney, Agent, or Firm—Pollock, Vande Sande & Priddy

[57] ABSTRACT

A method and apparatus for detecting and measuring radiation is disclosed. The apparatus includes a scintillator crystal and a photodetector optically coupled to the scintillator crystal as well as first and second analyzing means. The first analyzing means is coupled to an output of the photodetector for counting discrete electronic pulses generated by the photodetector. The second analyzing means operates simultaneous with the first analyzing means and is coupled to another output of the photodetector for integrating current generated by the photodetector. The method includes the steps of irradiating a scintillator with x-ray energy, detecting light emitted from the scintillator and converting the light into a flow of electrons, detecting and counting discrete pulses of the flow of electronics and simultaneously integrating electronic current corresponding to the flow of electrons.

14 Claims, 2 Drawing Sheets

DUAL MODE RADIOGRAPHIC MEASUREMENT METHOD AND DEVICE

FIELD OF INVENTION

This application relates to a method and apparatus for detecting and measuring radiation and particularly for use in a data acquisition system based on radiation illumination of a target.

BACKGROUND OF THE INVENTION

Such a data acquisition system requires detecting and measuring of transmitted X-rays over a wide range of X-ray intensities corresponding to a wide range of beam attenuations. This range is defined between the maximum intensity of the unattenuated beam at maximum aperture at the high end of the range, and by the full attenuation of a very dense object at minimum aperture at the low end of the range.

Existing methods and apparatus for detecting and measuring radiation employ a scintillator driving a photomultiplier. The scintillator, in response to impinging photons, generates optical energy (or light). The photomultiplier generates electrical current in response to detecting optical energy (or light). The output of the photomultiplier is usually coupled to analyzing circuits which operate either in the charge integration mode or the single photon counting mode. The output from the photomultiplier is theoretically a series of pulses. The frequency of the occurrence of these pulses is directly related to the frequency of radiation emission events or photons which are detected. The magnitude of each such pulse is related to the energy of the photons which are detected. Hence, there are two qualities of the output signal from the photomultiplier which may be used to develop a signal suitable for giving an output indication. When charge integration is used the electronic current generated by one of the photomultiplier electrodes is integrated and measured. The single photon counting mode on the other hand consists of detecting and counting discrete electronic pulses generated by one of the photomultiplier electrodes. Neither technique is sufficient to measure a wide range of X-ray intensities. The charge integration technique is incapable of measuring very low levels of X-ray radiation because of the presence of fluctuating dark current of the photomultiplier. The single photon counting technique is incapable of measuring very high levels of X-ray radiation because of the slow response time of typical scintillation crystals which cause individual X-ray pulses to blend together so they can no longer be resolved into individual pulses. A so-called pile up effect occurs whenever a new pulse is detected before the previous pulse has become extinguished. The incidence of this effect is related to the count rate. Hence the probability of its occurrence is all the greater the higher the pulse rate.

It is an object of the present invention to provide a method and apparatus which overcomes the deficiencies of the previously described prior art. Accordingly the present invention allows detection of X-ray data over a wide range of X-ray intensities by using the analyzing circuits simultaneously operating in charge integration and in single photon counting modes.

It is also another object of the present invention to provide a method and apparatus in which a significant power and cost savings can be achieved. Economic savings occur due to the fact that high-level charge integration signal in the system is generated by one of the low gain electrodes of the photomultiplier and therefore does not dissipate as much power in the bias circuitry. This power advantage is especially significant when a large array of detectors is used in a multichannel system or when the detectors are intended for use in the space environment where power is at a premium.

SUMMARY OF THE INVENTION

The above described objects and advantages are accomplished in radiation measuring device according to the present invention for measuring a wide range of X-ray intensity which employs a scintillation crystal for emitting light in response to radiation by X-rays and photodetector means optically coupled to the scintillator crystal for receiving the emitted light and converting it into electrical current. The photodetector means comprises a first and second output. A first measuring means is coupled to the first output of the photodetector for counting discrete electronic pulses generated by the photodetector means and producing a first output signal. A second measuring means is operated simultaneously with the first measuring means and coupled to a second output of the photodetector. The second measuring means includes integrating means for integrating current generated in the photodetector and produces a second output signal. Means are also provided for receiving outputs from both first and second measuring means and, based on that information, for measuring total amount of detected radiation.

Other objects and further scope of applicability of the present invention will become apparent from the detailed description given hereinafter. It should be understood however that the detailed description while indicating preferred embodiments of the invention is given by way of illustration only, since various changes and modifications within the spirit and scope of the invention will become apparent to those skilled in the art from the detailed description.

BRIEF DESCRIPTION OF THE DRAWINGS

The preferred embodiment of the invention is illustrated in the accompanying drawings in which.

DETAILED DESCRIPTION OF THE PREFERRED EMBODIMENTS

Figure 1:
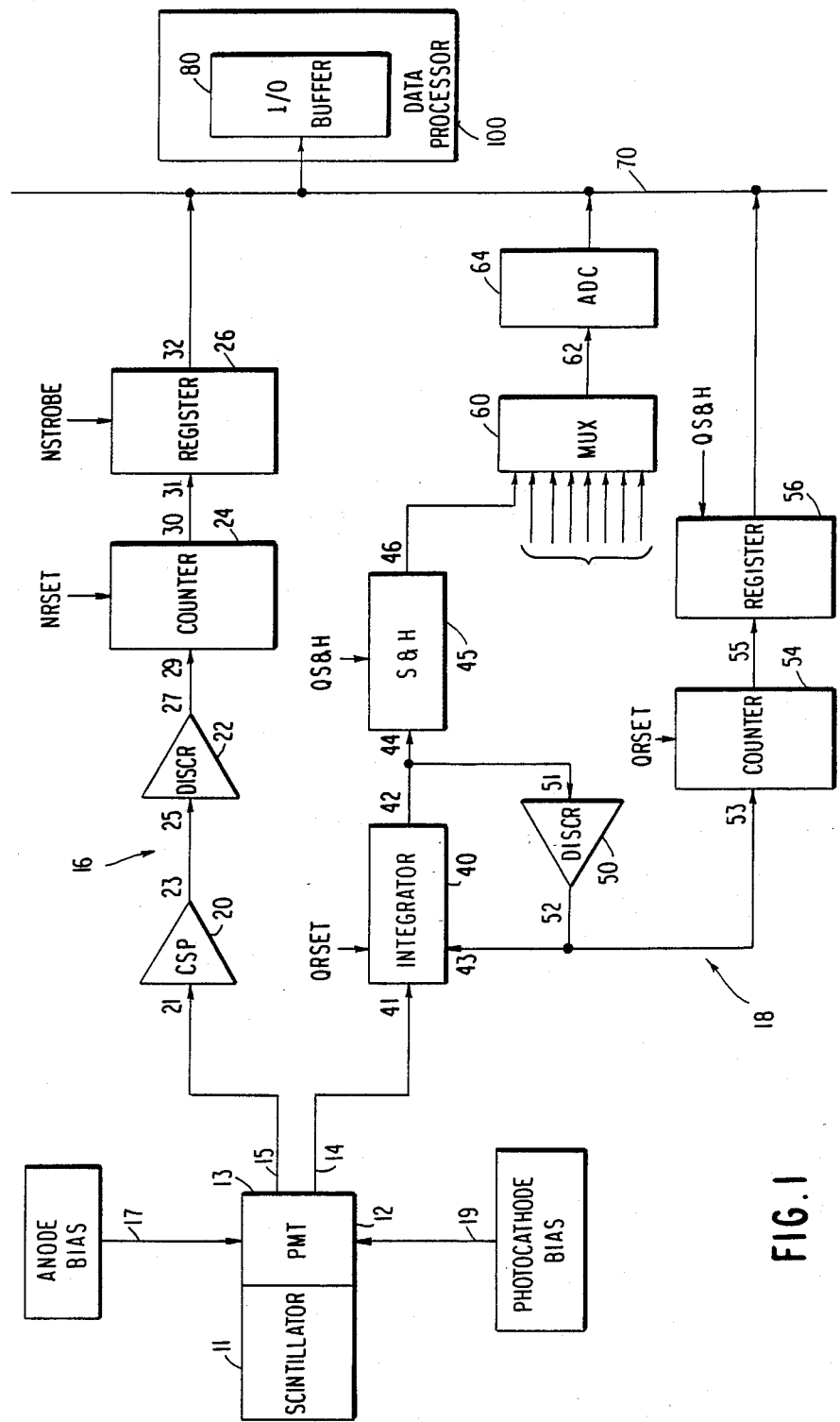
FIG. 1 shows as schematic block diagram of the measuring apparatus according to the present invention.
Figure 2:
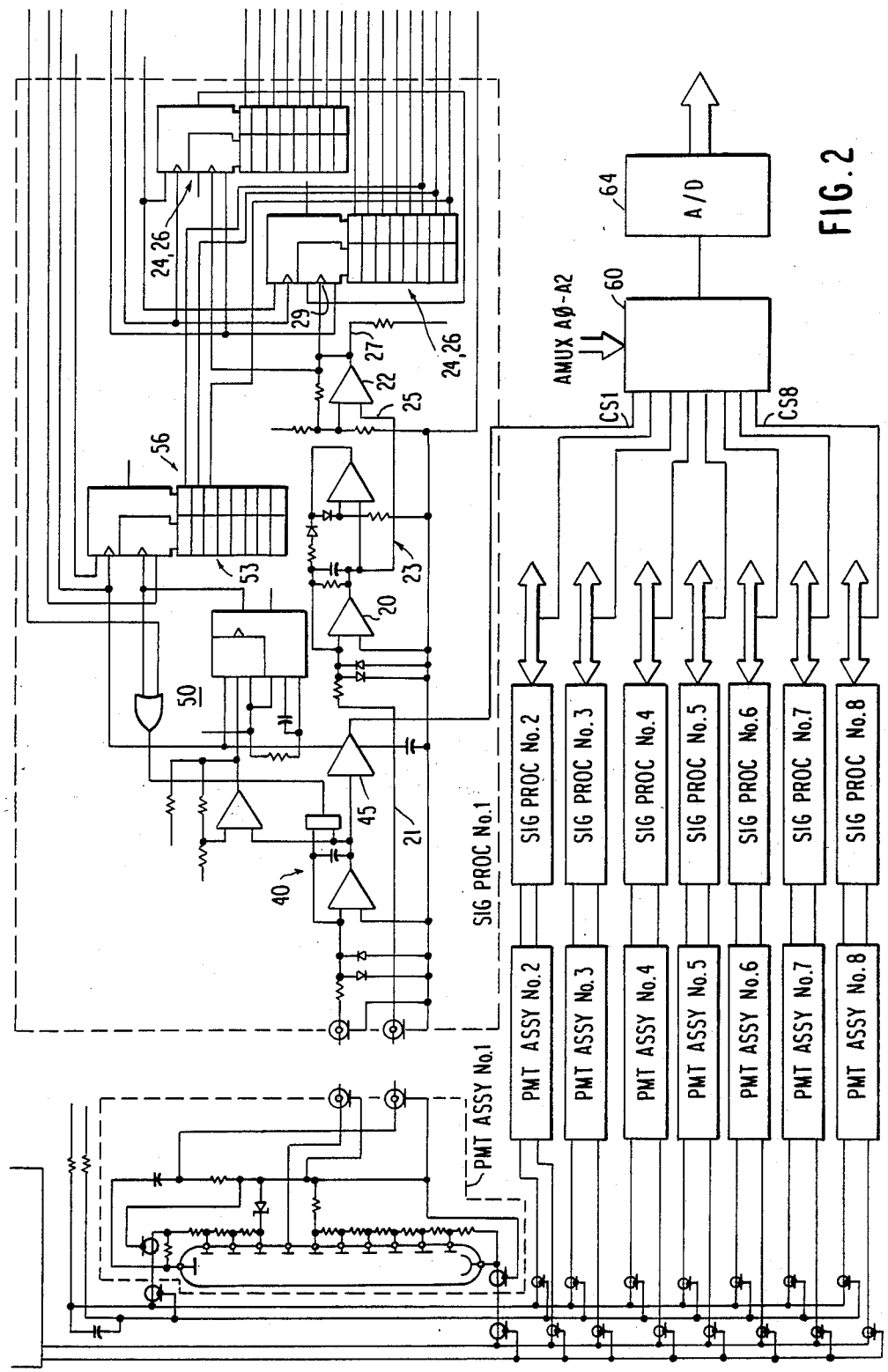
FIG. 2 is part schematic (of a typical channel) and part block diagram of the device including plural measuring channels.

Referring now to FIGS. 1 and 2, the measuring device includes detector 11 for detecting the radiation to be measured. Detector 11 comprises a scintillator which emits light in response to impinging X-ray radiation. The scintillator may be sodium iodide, cesium iodide or other suitable material capable of generating light which is directed to the photodetector 13. The photodetector is optically coupled to scintillator 11 and comprises a photomultiplier tube 12 which conventionally includes a cathode, a plurality of dynodes and an anode. The photomultiplier tube 12 is biased from separate anode and cathode power supplies 17 and 19. A first output 15 of the photodetector is connected to a first analyzing circuit 16 and a second analyzing circuit 18 is connected to a second output 14 of the photodetector. The first analyzing circuit 16 detects and counts discrete electronic pulses generated by the photodetector and the second analyzing circuit 18 operates simultaneously for integrating electronic current generated by the photodetector.

Accordingly, first and second analyzing circuits 16 and 18 simultaneously output measuring signals related to the detected radiation. In case of low levels of radiation the second analyzing circuit 18 may provide an inaccurate measuring signal due to the effect of dark currents on the relatively low output signals. In case of high levels of radiation the first analyzing circuit 16 may provide an inaccurate measuring signal due to the pile up effect. However these erroneous signals are mitigated by the fact that:

(1) In either case there is available another, more accurate measuring signal, and (2) There is an objective criterion from which to select the more accurate signal of the two. That objective criterion is one of the measuring signals: Whenever the output $M_{18}$ of the second analyzing circuit is above a given threshold $T_{18}$, then the ouput $M_{16}$ of the first analyzing circuit can be considered unreliable. Whenever the output $M_{18}$ of the second analyzing circuit is below the threshold $T_{18}$, then the output $M_{18}$ of the second analyzing circuit can be considered unreliable.

The signal source for the first analyzing circuit 16 is the anode of the photomultiplier tube 12. The signal source for the second analyzing circuit 18 is one of the photomultiplier dynodes which is operated at ground potential. In the described system the charge gain from the photocathode to this dynode operated at ground potential is determined mainly by the photocathode bias and secondarily by the anode bias. The charge gain from the grounded dynode to the anode is determined primarily by the anode bias and secondarily by the photocathode bias.

The intermediate dynodes of the photomultiplier tube 12 are biased from a voltage divider. The ohmic values of the components in the voltage divider are preselected to assure that the linearity of the signal at the second output 14 is not affected when the anode signal saturates.

The signal at the first output 15 of the photomultiplier tube 12 is AC coupled to an input 21 of a charge amplifier 20. The charge amplifier 20 provides pulse shaping of the arriving signals. Baseline restoration is required to recognize low-amplitude photon emission events among high-amplitude emission events. As is best seen from FIG. 2, a clamping circuit is provided for sensing negative excursions at the output 23 of the charge amplifier 20 and provides a compensating offset to return these excursions quickly to zero (see FIG. 2).

Output 23 of charge amplifier 20 is connected to an input 25 of a pulse discriminator 22 whose output 27 is conected to the clock input 29 of a binary counter 24. The binary counter 24 is incremented each time a pulse, corresponding to an X-ray emission event, is detected by the discriminator 22.

An output 30 from the counter 24 is connected to an input 31 of an output register 26 which, under the control of a strobe pulse (NSTROBE), transfers the contents of binary counter 24 to the register 26. The strobe pulse signals the end of a data acquisition interval. After the binary counter is strobed, it is reset to zero (NRSET) for the next data acquisition interval.

The output 32 from the register 26 is transferred to a signal processor (through the I/O buffer 80) at some time during the next following data acquisition interval under the control of the signal processor interface circuits.

The electronic current generated by the photomultiplier at the output 14 is the net of the primary electron current incident on that dynode from the previous dynode and the secondary current emitted to the next following dynode. It is thus of the opposite polarity of the anode signal current.

The output 14 is connected to an input 41 of a charge integrator 40 of the second analyzing circuit 18 for integrating electronic current emitted by the photomultiplier dynode. The charge integrator 40 has an output 42 connected to an input 44 of sample and hold circuit 45. The second analyzing circuit includes means for detecting overflows of charge integrator 40. It includes a discriminator 50 coupled to the output 42 of the integrator 40 and a binary counter 54 having an input 53 connected to an output 52 of discriminator 50 for counting each overflow occurrence. An output 55 of the binary counter 54 is coupled to register 56 responsive to a control signal for transferring the contents of the binary counter 54 to the register 56 and resetting the binary counter 54. Integrator 40 is reset at the end of a data acquisition interval by the QRSET signal, but only after the level of the integrator has been sotred in a sample and hold circuit 45. The integrator 40 may also be reset within a data acquisition interval is discriminator 50 detects that integrator output 42 approaches its full scale value. In that event, an overflow signal increments counter 54. The same signal, via input 43, resets the integrator 40.

The sample and hold circuit 45 has an output 46 connected through multiplexer 60 to a 13 bit analog-to-digital converter (ADC) 64 which is shared among the eight channels in the module. The circuitry of channel 1 is shown in FIG. 2 and described above. Each channel 2–8 contains components corresponding to channel 1 (except of course the multiplexer 60 and ADC 64 are shared among all channels). The output of ADC 64 is latched and read out under the control of the signal processor (again through the I/O buffer 80) together with the state of a three-bit register 56 which indicates the number of integrator overflows during the relevant data acquisition interval. The overflow indicator bits provide the three most significant bits of a 16-bit data word, the ADC 64 provides the 13 least significant bits. As seen in FIG. 1, the I/O buffer 80 is part of a data processor 100.

The data detected and measured by first analyzing means 16 and second analyzing means 18 is combined in data processor 100 using correlation calibration data relating equivalent measurements from the two circuits through a correlation coefficient. The digital output data of analyzing circuits 16 and 18 are transferred via bus 70 and stored in a tristate buffer 80 which is read out to the data processor 100. The bus 70 is a 16-bit bus. Data transfer protocols are compatible with an MC68000 microprocessor. Direct addressing of 256 data sources (16 in each module) is provided through an on-board address decoder (4 bits) and backplane jumpers (4 bits). Decoding of more significant address bits is accomplished in a separate control module that combines the address strobe signal of the microprocessor with the higher order address bits.

Thus, for any data acquisition interval, and for each channel, the data processor 100 has available the output of the first analyzing circuit ($M_{16}$) and the output of the second analyzing circuit ($M_{18}$). As already described, the data processor 100 determines if $M_{18} \geq T_{18}$. If $M_{18} \geq T_{18}$, then $M_{18}$ is used by the data processor and $M_{16}$ is discarded. On the other hand, if the data processor 100 determines that $M_{18} < T_{18}$, then $M_{18}$ is discarded and $M_{16}$ is considered valid by the data processor 100. In this fashion, the dynamic range of the measuring device is extended beyond the lower limit of the prior art current integration techniques and beyond the upper limit of the prior art counting techniques. It should be apparent that the preferred embodiment described herein is exemplary only and not limiting; the scope of the invention should be construed in accordance with the claims appended hereto.

Having thus described my invention, what I claim as new, and desire to secure by Letters Patent is:

1. A radiation measuring device for measuring a wide range of X-ray intensities comprising:
   a scintillator crystal for emitting light in response to irradiation by X-rays;
   photodetector means optically coupled to said scintillator crystal for receiving the emitted light and converting said emitted light into electrical current, said photodetector means comprising first and second outputs;
   first and second analyzing means respectively responsive simultaneously to said first and second outputs;
   said first analyzing means coupled to said first output of said photodetector means for counting discrete electronic pulses generated by said photodetector means, said first analyzing means producing a first output signal;
   said second analyzing means operated simultaneously with said first analyzing means coupled to said second output of said photodetector means, said second analyzing means including integrating means for integrating current generated by said photodetector means, said second analyzing means producing a second output signal;
   receiving means responsive to said first and second output signals for measuring detected radiation.

2. A device according to claim 1 wherein said photodetector means is a photomultiplier tube.

3. A device according to claim 1 wherein said second analyzing means comprises an integrator and a sample and hold circuit with an output of said integrator connected to said sample and hold circuit.

4. A device according to claim 1 wherein said seond analyzing means further comprises means for counting any overflow of said integrating means during a data acquisition period.

5. A device according to claim 4 wherein said receiving means further comprises means for receiving an output from said means for counting any overflow of said integrating means.

6. A device according to claim 1 including plural measuring channels, with a scintillator crystal, photodetector means, first analyzing means and second analyzing means for each said channel, said device further comprising:
   a multiplexer with plural inputs and an output and an analog to digital converter coupled to said multiplexer output;
   said multiplexer including a different input coupled to outputs from each of said second analyzing means.

7. A device according to claim 6 wherein said receiving means comprises a data processor.

8. A device according to claim 2 wherein said first analyzing means comprises:
   a charge amplifier coupled to said first output and wherein said first output comprises an anode of said photomultiplier tube;
   a pulse discriminator coupled to an output of said charge amplifier;
   a binary counter with a clock input coupled to an output of said pulse discriminator;
   register means responsive to a control signal for transferring contents of said binary counter to said register and resetting said binary counter; and
   means connecting said register to said receiving means.

9. A device according to claim 4 wherein said means for counting overflow of said integrating means comprises:
   a discriminator coupled to an output of said integrating means for detecting an occurrence of said overflow, a binary counter coupled to an output of said discriminator for counting each said overflow occurrence, a register, means responsive to a control signal for transferring contents of said binary counter to said register and resetting said binary counter; and means connecting said register to said receiving means.

10. A device according to claim 3 wherein said integrator is coupled to said second output and wherein said second output comprises a dynode of said photomultiplier operated at ground potential.

11. A radiation measuring device as recited in any one of claims 1-3 which include means for enabling said receiving means to respond to both said first and second output signals within a given data acquisition interval.

12. A method for measuring a wide range of X-ray intensities comprising the steps of:
   (a) irradiating a scintillator with X-ray energy;
   (b) detecting light emitted from the scintillator and converting said light into a flow of electrons;
   (c) detecting and counting discrete pulses in said flow of electrons;
   (d) simultaneous with said step (c), integrating electronic current corresponding to said flow of electrons; and
   (e) storing a representation of (1) a count of said pulses and (2) an integrated current value, for measuring said x-ray intensity.

13. A method as recited in claim 12 comprising a further step of selecting either said count representation or said integrated current value representation as a measurement of x-ray intensity.

14. A method as recited in claim 12 or 13 comprising a further step of selecting said count representation or said integrated current value representation by comparing said integrated current value representation to a threshold.

* * * * *